United States Patent [19]

Grey

[11] Patent Number: 5,171,830

[45] Date of Patent: Dec. 15, 1992

[54] CATALYTIC PROCESS FOR THE PREPARATION OF POLYALKYLENE CARBONATES

[75] Inventor: Roger A. Grey, West Chester, Pa.

[73] Assignee: ARCO Chemical Technology, L.P., Wilmington, Del.

[21] Appl. No.: 746,674

[22] Filed: Aug. 16, 1991

[51] Int. Cl.$^5$ .............................................. C08G 64/30
[52] U.S. Cl. ..................................... 528/371; 521/25; 525/439; 528/370
[58] Field of Search .................. 528/371, 370; 521/25; 525/439

[56] References Cited

U.S. PATENT DOCUMENTS

| | | | |
|---|---|---|---|
| 2,787,632 | 4/1957 | Stevens | 260/463 |
| 2,789,968 | 4/1957 | Reynolds et al. | 260/77.5 |
| 3,426,042 | 2/1969 | Hostettler et al. | 260/340.2 |
| 3,442,854 | 5/1969 | Curtius et al. | 528/371 |
| 3,663,569 | 5/1972 | Lew | 260/340.2 |
| 4,440,937 | 4/1984 | Krimm et al. | 549/228 |
| 4,447,659 | 5/1984 | Blewett | 568/876 |

FOREIGN PATENT DOCUMENTS 64-9225  1/1989  Japan.
1-252629 10/1989  Japan.

OTHER PUBLICATIONS

Kirk-Othmer, *Encyclopedia of Chemical Technology*, 3rd ed. (1982) vol. 19, pp. 521-522, 526-528; vol. 2, pp. 272-273, 275.

*Hawley's Condensed Chemical Dictionary*, 11th Ed. (1987) pp. 53, 988-989.

Fletcher, John H. et al., *Nomenchature of Organic Compounds: Principles and Practice*, Advances in Chemistry Series 126 (1974), Chapters 23-24, pp. 180-195.

Fieser and Fieser, *Advanced Organic Chemistry* (1961), Chapter, 14, pp. 488-495.

Morrison and Boyd, *Organic Chemistry*, 5th Ed. (1987) Chapters 26-27, pp. 931-935, 951, 960.

Solomons, *Organic Chemistry*, Revised Printing (1976) Chapter 21, pp. 815-821.

Polymer Reviews 9 "Chemistry and Physics of Polycarbonates", pp. 9-20 (1964).

J. Am. Chem. Soc. 52 (1930) 314.

*Primary Examiner*—Harold D. Anderson
*Attorney, Agent, or Firm*—Jonathan L. Schuchardt

[57] ABSTRACT

A method for producing polyalkylene carbonates is disclosed. The polymers are prepared by reacting a diol having at least four carbons separating the hydroxyl groups with a diester of carbonic acid in the presence of a catalyst selected from tertiary amines, alkylammonium salts, pyridinium salts, and basic ion-exchange resins that contain active alkylammonium or tertiary amino groups.

15 Claims, No Drawings

CATALYTIC PROCESS FOR THE PREPARATION OF POLYALKYLENE CARBONATES

FIELD OF THE INVENTION

The invention relates to polyalkylene carbonate polymers. In particular, the invention is a process for preparing polyalkylene carbonate polymers by transesterification. The polymers, which have hydroxyl or carbonate ester end groups, are useful as pressure-sensitive adhesives, and as soft-segment intermediates for thermoplastic polyesters, polyurethanes, and other polymer applications.

BACKGROUND OF THE INVENTION:

There are at least five general methods of preparing aliphatic polycarbonates. These are outlined in *Polymer Reviews* 9 "Chemistry and Physics of Polycarbonates," pp. 9-20. Aliphatic diols react with phosgene or bis-chlorocarbonic esters of aliphatic diols to produce polycarbonates. Cyclic carbonates of aliphatic dihydroxy compounds with larger than five-membered rings can be polymerized.

Transesterification of aliphatic dihydroxy compounds with carbonic acid diesters is a well-known and important method of preparing aliphatic polycarbonates. This method avoids the need to use phosgene, a toxic gas that is difficult to handle safely. Cyclic carbonates are usually produced when 1,2- or 1,3-diols are used, while polyalkylene carbonates are favored when four or more carbons separate the hydroxyl groups (See *J. Am. Chem. Soc.* 52 (1930) 314).

When dialkyl carbonates are used, transesterification will ordinarily not occur in the absence of a catalyst, even at elevated temperatures. Shimizu and Komiya reported (Japanese Kokai No. 1-252629) a synthesis of aliphatic polycarbonates by transesterification in the absence of a catalyst. According to the authors, the reaction works only with dimethyl carbonate and requires high temperatures (180° C. to 250° C.). Strongly basic catalysts, such as alkali metal alcoholates, are by far the catalysts most commonly used. Other transesterification catalysts described in the literature, typically bases and transition metal compounds, are outlined in U.S. Pat. Nos. 4,440,937, 3,426,042, and 3,663,569. These include, among other catalysts, oxides, hydroxides, alcoholates, carboxylates, and carbonates of sodium, potassium, aluminum, thallium, and lead, as well as various titanium compounds, metal chelates, and manganese salts.

Unfortunately, the transesterification catalysts known in the art suffer from a number of disadvantages. Catalyst residues present in polycarbonate polymers often adversely affect the thermal stability of thermoplastic resins by catalyzing depolymerization reactions ("unzipping") at the elevated temperatures used to process the polymers. Prepolymers made from isocyanates and polycarbonate polyols often gel prematurely if alkaline catalyst residues are present in the polycarbonate polyol. In addition, because alkali catalyzes depolymerization of the polycarbonates, polymers of high molecular weight (greater than about 1000) are often difficult to prepare and isolate. For these reasons, catalyst residues are usually removed—at great expense—before the polycarbonate product is used further. Onerous acid-washing and adsorption methods are commonly used to remove the alkaline catalyst residues from the polymers.

A method for preparing polyalkylene carbonate polymers that overcomes the problems with alkaline catalysts, and overcomes the need to remove a transesterification catalyst from a viscous polymer, is needed. Preferably, the method allows preparation of high molecular weight polyalkylene carbonate polymers under moderate conditions without the use of phosgene.

SUMMARY OF THE INVENTION

The invention is a process for making a polyalkylene carbonate polymer. A diol having at least four carbon atoms separating the hydroxyl groups is reacted with a diester of carbonic acid in the presence of a transesterification catalyst at a temperature and for a time sufficient to produce the polyalkylene carbonate polymer. The catalyst is selected from the group consisting of tertiary amines, alkylammonium salts, pyridinum salts, and basic ion-exchange resins that contain active alkylammonium or tertiary amino groups.

DETAILED DESCRIPTION OF THE INVENTION

According to the invention, polyalkylene carbonate polymers are prepared from diols and carbonate diesters by transesterification in the presence of a tertiary amine, alkylammonium salt, pyridinium salt, or basic ion-exchange resin that contains a tertiary amino or alkylammonium group. The catalysts of the invention allow preparation of high molecular weight polycarbonate polymers. In addition, the catalysts can be readily separated from the polymers, or in some cases, can be left in the polymer without adversely affecting performance.

Diols useful in the process of the invention have four or more carbon atoms separating the hydroxyl groups. The diols can be low molecular weight, unbranched diols such as 1,4-butanediol and 1,6-hexanediol, or they may be branched diols such as 3-methyl-1,5-pentanediol. The diols may have any number of alkyl, aryl, or aralkyl substituents. The hydroxyl end groups may be primary, secondary, or tertiary.

Especially suitable are diols having the formula:

HO—(CRR')$_n$—OH in which each of R and R' separately represents a monovalent radical selected from the group consisting of hydrogen, $C_1$–$C_5$ alkyl, $C_1$–$C_{10}$ aralkyl, and $C_1$–$C_{10}$ aryl, and n is an integer from 4 to 10.

Examples of suitable diols include, but are not limited to, 1,4-butanediol, 1,5-pentanediol, 3-methyl-1,5-pentanediol, 1,6-hexanediol, and the like. Mixtures of diols can be used, and mixtures are often preferred when physical property modification (e.g., lower crystallinity or melting point) is desired.

Polyether diols such as polyethylene glycol and polypropylene glycol, and polyester diols such as polyethylene glycol adipate, are also suitable diols. Block copolymers of polyethers or polyesters and polycarbonates can be prepared using these diols as starting materials in the transesterification process of the invention.

Diesters of carbonic acid useful in the process of the invention have the formula:

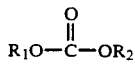

in which each of $R_1$ and $R_2$ separately represents a monovalent radical selected from the group consisting of alkyl, aralkyl, and aryl. Examples of suitable diesters of carbonic acid that may be used include, but are not limited to, dimethyl carbonate, diethyl carbonate, diphenyl carbonate, methyl ethyl carbonate, methyl phenyl carbonate, methyl benzyl carbonate, di-n-butyl carbonate, and the like, and mixtures thereof. Preferably, $R_1$ and $R_2$ are the same. Preferred carbonate diesters are dimethyl carbonate, diethyl carbonate, and diphenyl carbonate.

Transesterification catalysts useful in the process of the invention include tertiary amines, alkylammonium salts, pyridinium salts, and strong or weak-base ion-exchange resins that contain active groups selected from tertiary amino and alkylammonium. The amount of catalyst required will depend on many factors, including temperature, reaction time, and other variables.

Tertiary amines useful in the process of the invention are all aliphatic and aromatic trisubstituted amines that have a lone pair of electrons. Suitable tertiary amines include compounds having the formula:

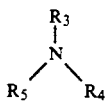

in which each of $R_3$, $R_4$, and $R_5$ separately represents a monovalent radical selected from the group consisting of $C_1$–$C_{30}$ alkyl, hydroxyalkyl, aryl, and aralkyl. The groups may be linear, branched, or cyclic.

Suitable tertiary amines include aromatic tertiary amines such as pyridine, and pyridines substituted with one or more nonreactive substituents, including halogens, alkyl, aryl, aralkyl, alkoxy, and nitro groups.

Also suitable are bicyclic and polycyclic compounds that contain a tertiary amine functionality, such as DABCO, and compounds that contain more than one tertiary amino group, such as bis(N,N-dialkylamino)alkanes.

Suitable amines include, for example, triethylamine, tri-n-propylamine, tri-n-butylamine, methyl diethylamine, N,N-dimethylcyclohexylamine, pyridine, 4-chloropyridine, 3-nitropyridine, 4-methoxypyridine, N,N-dimethylethanolamine, N,N-diethylpropanolamine, 1,8-diazabicyclo[5.4.0]undec-7-ene (DBU), 1,4-diazabicyclo[2.2.2]octane (DABCO), 1,5-diazabicyclo[4.3.0]non-5-ene (DBN), 1,2-bis(N,N-dimethylamino)ethane, 1,3-bis(N,N-dimethylamino)propane, 1,4-bis(N,N-diethylamino)butane, 1,1,1-tris(N,N-dimethylaminomethyl)methane, and the like, and mixtures thereof. Preferred tertiary amines are triethylamine, tri-n-butylamine, and DBU.

The amount of tertiary amine useful in the process of the invention is typically within the range of about 0.1 to about 25 mole percent based on the amount of diol used. Preferably, the range is about 1.0 to about 5.0 mole percent.

Alkylammonium salts useful in the invention as transesterification catalysts have the general formula:

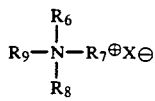

in which each of $R_6$, $R_7$, $R_8$, and $R_9$ separately represents a monovalent radical selected from the group consisting of hydrogen, alkyl, hydroxyalkyl, aryl, and aralkyl, and only one of said $R_6$ through $R_9$ groups may be hydrogen. The alkyl and aryl groups may be linear, branched, or cyclic, and may contain from 1 to 30 carbon atoms. The counterion, X-, is a monovalent anion selected from the group consisting of halide, hydroxide, alkoxide, carbonate, bicarbonate, dihydrogen phosphate, and bisulfate.

Pyridinium salts, i.e., the reaction products of pyridine or ring-substituted pyridines with protic acids or alkyl halides are also suitable. Compounds that contain multiple alkylammonium or pyridinium salts, such as 1,2-bis(trimethylammonium chloride)ethane are suitable. Bicyclic or polycyclic compounds that contain one or more alkylammonium groups, such as the reaction product of DBU and hydrochloric acid, are also suitable.

Examples of suitable alkylammonium or pyridinium salts include, but are not limited to, tetra-n-butylammonium bromide, tri-n-butylamine hydrochloride, tetra-n-butylammonium dihydrogen phosphate, trimethylammonium iodide, trimethylamine hydrochloride, trimethylbenzylammonium chloride, tetraoctylammonium bromide, tetra-n-butylammonium hydroxide, tetra-n-butylammonium hydrogen sulfate, pyridinium methyl iodide, pyridine hydrochloride, pyridinium hydrofluoroborate, 4-chloropyridinium methyl bromide, trimethyl(2-hydroxyethyl)ammonium chloride, 1,2-bis(trimethylammonium chloride)ethane, 1,4-bis(tributylammonium chloride)butane, DBU hydrochloride, and the like, and mixtures thereof.

The amount of alkylammonium or pyridinium salt employed is typically within the range of about 0.1 to about 25 mole percent based on the amount of diol used. Preferably, the amount used is within the range of about 0.5 to about 5.0 mole percent.

Strong-base and weak-base ion exchange resins that contain tertiary amino or alkylammonium active groups are effective transesterification catalysts in the process of the invention. The strong-base resins are typically quaternary ammonium derivatives of styrene/divinylbenzene copolymers, which are produced from the reaction of chloromethylated styrene/divinylbenzene with a tertiary amine such as trimethylamine or dimethylethanolamine. Examples of commercially available resins in this category include "AMBERLITE IRA-400(Cl)" and "AMBERLITE IRA-400(OH)" (Rohm and Haas Co.), and "DOWEX 1X2-100" (Dow Chemical Co.) ion-exchange resins. The weak-base resins are typically amine derivatives of chloromethylated polystyrene, condensation products of epichlorohydrin with secondary or tertiary amines, or aminated condensation products of phenol and formaldehyde. Examples of commercially available resins in this category include "AMBERLITE IRA-93" and "DUOLITE A-75" (Rohm and Haas Co.) ion-exchange resins.

The amount of ion-exchange resin useful in the process of the invention is typically within the range of about 1 to about 50 weight percent based on the amount of diol used. Preferably, this range is about 10 to about 30 weight percent.

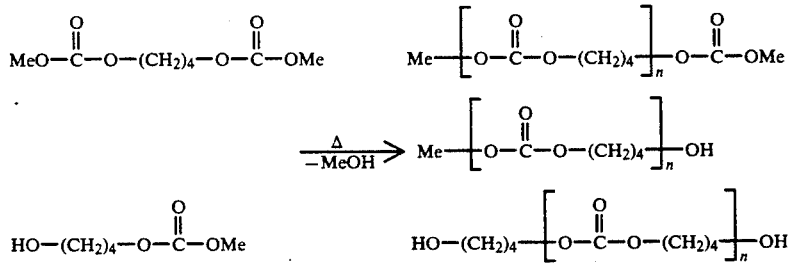

The process of the invention may be performed at any desired temperature. The reaction is preferably performed at a temperature within the range of about 0° C. to about 220° C. More preferably, the temperature is greater than about 120° C. Most preferred is the range from about 160° C. to about 190° C. Ordinarily, the reaction temperature will be high enough to permit removal of volatile by-products by distillation.

The process of the invention may be performed at pressures less than, greater than, or equal to atmospheric pressure. Reaction at sub-atmospheric pressure may be used to facilitate removal of volatile by-products.

Ordinarily, the diol, carbonate diester, and transesterification catalyst are combined and heated with agitation in a suitable reaction vessel. The order in which the reagents are combined is not critical. Usually, the diol and carbonate diester are used in approximately equimolar amounts to make a high molecular weight polymer, although an excess amount of either may be used. The reaction vessel may be constructed of any suitable material, for example, glass or metal. Preferably, the reaction mixture is agitated in some way, such as by magnetic or mechanical stirring. The process of the invention may be performed batchwise or continuously, as desired.

The reaction is preferably performed in a dry, inert atmosphere to prevent undesirable hydrolysis or oxidation reactions. Suitable inert gases include nitrogen, argon, and the like.

The reaction may be performed without any solvent present if desired, or an inert organic solvent may be used. Examples of suitable inert organic solvents include, but are not limited to, aliphatic and aromatic hydrocarbons, certain halogenated hydrocarbons (for example, dichloromethane and dichloroethane), ethers, amides, and the like, and mixtures thereof.

The initial reaction products formed in the process of the invention are relatively low molecular weight carbonate mono- and diesters:

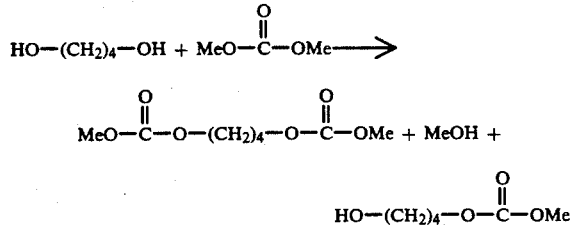

As the reaction temperature is increased, condensation polymerization progresses, volatile by-products are removed by distillation, and polymer molecular weight increases:

The resulting polymers have either hydroxyl end groups, carbonate ester end groups, or a combination of both, depending on the relative amounts of diol and carbonate ester used, and also on the degree of polymerization.

An advantage of the present invention is that polymers of relatively high molecular weight having little tendency to depolymerize ("unzip") can be produced.

If desired, the catalyst can be physically separated from the polymer product by any method known to those skilled in the art, including, for example, filtration. Catalyst removal is particularly desirable when the catalyst is an ion-exchange resin.

Some of the catalysts of the invention are volatile and may be advantageously separated from the polymer by various stripping methods, including vacuum stripping, steam stripping, and the like. These methods are particular well suited to removal of volatile tertiary amines, such as triethylamine, from the polymer. This represents a great advantage over the prior art methods that involve alkaline catalysts because stripping tends to be much less cumbersome to practice on a commercial scale than chemical neutralization and filtration methods. Polymers free of catalyst residues can be prepared, making them especially suitable for use in further applications such as polyurethane formulation and the like.

An advantage of the alkylammonium salt catalysts is that they are essentially neutral and can often be left in the polymer without adversely affecting polymer stability or causing undesirable catalysis during formulation or processing.

The following examples merely illustrate the invention. Those skilled in the art will recognize many variations that are within the scope of the claimed invention.

EXAMPLE 1

Preparation of 1,4-Butanediol Polycarbonate Tetra-n-butylammonium bromide catalyst A thick-walled glass tube equipped with a magnetic stir bar is purged with nitrogen and charged with 1,4-butanediol (19 g, 0.21 mol), dimethyl carbonate (60 g, 0.67 mol), and tetra-n-butylammonium bromide (70 mg, 0.22 mmol). The tube is sealed and the reaction mixture is heated to 150° C. for 8 h. Gas chromatography analysis shows 95% conversion to the mono- and bis(methylcarbonate) esters of 1,4-butanediol. The heating bath temperature is raised gradually to 160° C., and volatile by-products are removed by distillation at atmospheric pressure. The residue is heated to 200° C. at 0.5 mm for 3 h to complete the polymerization, during which time about 1 g of bis(methyl carbonate) ester distills from the mixture. The reaction mixture is allowed to cool to 50°

C., and chloroform (60 mL) is added to the viscous oil. The polymer is precipitated by adding the chloroform solution dropwise to methanol (500 mL) with stirring. The polymer is filtered, washed with methanol, and oven dried at 30° C., 1 mm for 72 h, yielding 21 g of dry solids. Gel permeation chromatography (GPC) analysis indicates $M_w=3700$, $M_n=2400$. Differential scanning calorimetry (DSC) measurements indicate a $T_g=41°$ C. The polymer melts at about 63°-64° C. Spectra (infrared, carbon and proton NMR) and elemental analysis are consistent with a polymer having mostly the following structure:

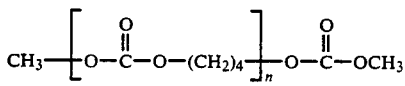

A weak hydroxyl band in the infrared spectrum, and a hydroxyl number of 1.9 mg KOH/g indicates that about 10% of the polymer has the following structure:

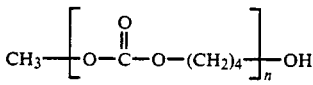

COMPARATIVE EXAMPLE 2

Preparation of 1,4-Butanediol Polycarbonate—No catalyst

The method of Example 1 is generally followed with 1,4-butanediol (19 g, 0.21 mol) and dimethyl carbonate (18 g, 0.20 mol). The initial two-phase mixture is heated at 120° C. for 18 h. Upon cooling to 23° C., the mixture separates again into two layers. Gas chromatographic analysis of both phases shows the presence of less than one percent methanol, which is a by-product that forms if transcarbonation or polymerization occurs.

EXAMPLE 3

Preparation of 1,6-Hexanediol Polycarbonate

The method of Example 1 is generally followed with 1,6-hexanediol (26 g, 0.22 mol), dimethyl carbonate (40 g, 0.44 mol), and tetra-n-butylammonium bromide (0.71 g, 2.2 mmol). The sealed tube is heated to 120° C. for 16 h, resulting in about 67% conversion of 1,6-hexanediol to the mono- and bis(methyl carbonate) esters. After removing volatile material, the residue is heated to 200° C. at 1 mm for 1 h to complete polymerization. After cooling to 60° C., chloroform (80 mL) is added, and the polymer is precipitated using isopropyl alcohol (600 mL). The polymer product is dried as in Example 1, yielding 27 g of dry solids. GPC indicates $M_w=7640$, $M_n=5200$. DSC analysis shows a $T_g$ of about 40° C. The polymer melts at about 52° C. Spectra (infrared, carbon and proton NMR) and elemental analysis are consistent with a polymer having mostly the following structure:

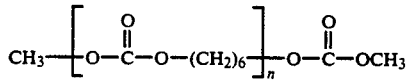

A weak hydroxyl band in the infrared spectrum, and a hydroxyl number of 2.6 mg KOH/g indicates that about 15% of the polymer has the following structure:

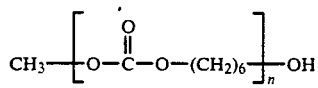

EXAMPLE 4

Preparation of 3-Methyl-1,5-Pentanediol Polycarbonate

The procedure of Example 1 is generally followed with 3-methyl-1,5-pentanediol (19 g, 0.16 mol), dimethyl carbonate (50 g, 0.55 mol), and tetra-n-butylammonium bromide (0.66 g, 2.0 mmol). The sealed tube is heated to 120° C. for 6 h, resulting in about 72% conversion of 3-methyl-1,5-pentanediol to the mono- and bis(methyl carbonate) esters. After removing volatile material, polymerization is induced by heating the residue to 190° C.-210° C. at 1 mm for 2 h, during which time about 2 g of bis(methyl carbonate) ester distills from the mixture. After cooling to room temperature, a viscous oil having GPC $M_w=1850$ and $M_n=1150$ is obtained. NMR spectra (carbon and proton) are consistent with a polyalkylene carbonate polymer.

EXAMPLE 5

Preparation of 1,4-Butanediol Polycarbonate Triethylamine catalyst

A one-liter single-neck flask equipped with a magnetic stir bar is charged with 1,4-butanediol (144 g, 1.6 mol), dimethyl carbonate (290 g, 3.2 mol), and triethylamine (1.6 g, 16 mmol). A distillation head with total reflux capacity is attached. Under a nitrogen atmosphere, the reaction mixture is heated at vigorous reflux (oil bath temp=105° C.) for 4 h. Gas chromatography analysis shows about 98% conversion of 1,4-butanediol to the mono- and bis(methyl carbonate) esters. Volatiles are removed by distillation at atmospheric pressure, while the oil bath temperature is allowed to increase to 160° C. The residue is heated at 180° C.-200° C. for 4 h at 1 mm, during which time polymerization occurs, and about 14 g of bis(methyl carbonate) ester are isolated by distillation. The reaction mixture is cooled to about 60° C., and chloroform (200 mL) is added to the viscous oil. The chloroform solution is added dropwise to methanol (2 L) with stirring to precipitate the polymer. The product is filtered, washed with methanol, and oven dried at 30° C., 1 mm for 72 h, yielding 165 g of dry solids. GPC shows $M_w=4200$, $M_n=2700$. DSC indicates a $T_g=44°$ C. The polymer melts at about 64°-65° C. Hydroxyl number: 1.0 mg KOH/g. The spectra are consistent with a product mixture as described in Example 1, but with about 5% of the monohydroxy-terminated polycarbonate product.

EXAMPLE 6

Preparation of 1,4-Butanediol Polycarbonate

The procedure of Example 5 is generally followed using 136 g of dimethyl carbonate (1.5 mol). The product is dried at 60° C., 1 mm for 72 h to give 101 g of dry solids. GPC shows $M_w=3900$, $M_n=2800$. DSC analysis indicates a $T_g=45°$ C. The polymer melts at about 63°-65° C. Hydroxyl number 44 mg KOH/g. The spectra (proton and carbon NMR) and elemental analysis are consistent with a polyalkylene carbonate diol polymer having the structure:

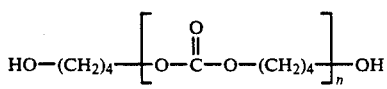

EXAMPLE 7

Preparation of 1,4-Butanediol Polycarbonate using Diethyl Carbonate and DBU

A thick-walled tube equipped with a magnetic stir bar is charged with 1,4-butanediol (19 g, 0.21 mol), diethyl carbonate (22 g, 0.19 mol), and 1,8-diazabicyclo[5.4.0]-undec-7-ene (DBU) (1.5 g, 0.010 mol). The headspace is purged with nitrogen, the tube is closed, and the mixture is heated at 120° C. for 24 h. After cooling to 23° C., the reaction mixture is transferred to a 100-mL round-bottom flask for distillation. Ethanol is recovered by atmospheric distillation, and the oil bath temperature is allowed to increase to 160° C. Unreacted 1,4-butanediol (about 6 g) is removed at reduced pressure (1 mm). The mixture is heated under vacuum at 180° C. to 200° C. for 2 h. After cooling to about 0° C., chloroform (25 mL) is added. The polymer/chloroform solution is added dropwise to methanol (250 mL) to precipitate the polymer. The polymer is filtered, washed with methanol, and oven dried at 30° C., 1 mm for 24 h to give about 7 g of dry solids. GPC analysis indicates $M_w=2800$, $M_n=1700$.

EXAMPLE 8

Preparation of 1,4-Butanediol Polycarbonate using Diphenyl Carbonate and Triethylamine A 100-mL round-bottom flask equipped with a magnetic stir bar is charged with 1,4-butanediol (19 g, 0.21 mol), diphenyl carbonate (43 g, 0.20 mol), and triethylamine (1.0 g, 0.010 mol). A distillation head is attached to the flask, and the reaction mixture is heated at 120° C. for 4 h. A vacuum of 1 mm is carefully applied, and phenol distills. The reaction mixture is then heated to 180° C.-200° C. for 2 h. The mixture is cooled to about 60° C., and chloroform (25 mL) is added to the viscous oil. The chloroform solution is added dropwise to methanol (250 mL). The precipitated polymer is filtered, washed with methanol, and dried in a vacuum oven (30° C., 1 mm) for 24 h to give 18 g of polycarbonate product. GPC indicates $M_w=2700$, $M_n=2100$.

EXAMPLE 9

Preparation of 1,4-Butanediol Polycarbonate using Diphenyl Carbonate and a Basic Ion-Exchange Resin A 100-mL round-bottom flask equipped with a magnetic stir bar is charged with 1,4-butanediol (9.0 g, 0.10 mol), diphenyl carbonate (22 g, 0.10 mol), and "AMBERLITE IRA-400(Cl)" ion-exchange resin (Product of Rohm and Haas Company) (3.0 g). The reaction mixture is blanketed with nitrogen and heated at 130° C. for 16 h. A vacuum of 1 mm is carefully applied, and phenol and unreacted 1,4-butanediol are removed by distillation. After cooling to 35° C., dichloromethane (60 mL) is added. The solution is filtered to remove the resin, and the resin is washed with additional dichloromethane. The organic filtrates are combined, and the solvent is removed by distillation at atmospheric pressure. The resulting oil is heated at 180° C. to 200° C. for 2 h under vacuum (1 mm). After cooling the mixture to 60° C., chloroform (25 mL) is added. The chloroform solution is added to methanol (250 mL) to precipitate the polymer. The precipitated polymer is filtered, washed with methanol, and is dried in a vacuum oven (30° C., 1 mm) for 24 h to give 6.6 g of polycarbonate product. GPC indicates $M_w=7000$, $M_n=4700$.

EXAMPLE 10

1,4-Butanediol Polycarbonate as a Hot-melt Adhesive

A sample of 1,4-butanediol polycarbonate is melted in an oven at 150° C. and a thin film is applied onto a glass plate (3 cm×5 cm×1.5 cm). Before the sample solidifies, another glass plate of the same dimensions is pressed onto the molten polymer. The plates are allowed to sit for about 10 min, after which the plates are well adhered. Similar results were obtained when the polycarbonate was used to bond wood, aluminum, stainless steel, and other materials.

I claim:

1. A process for making a polyalkylene carbonate polymer, said process comprising reacting a diol having at least 4 carbons separating the hydroxyl groups with a diester of carbonic acid in the presence of a catalyst selected from the group consisting of tertiary amines and basic ion-exchange resins containing active tertiary amino groups, at a temperature and for a time sufficient to produce the polyalkylene carbonate polymer.

2. The process of claim 1 wherein the diol has the formula:

$$HO-(CRR')_n-OH$$

in which each of R and R' separately represents a monovalent radical selected from the group consisting of hydrogen, $C_1-C_5$ alkyl, $C_1-C_{10}$ aryl, and $C_1-C_{10}$ aralkyl, and n is an integer from 4 to 10.

3. The process of claim 1 wherein the diol is selected from the group consisting of 1,4-butanediol, 1,5-pentanediol, 1,6-hexanediol, 3-methyl-1,5-pentanediol, and mixtures thereof.

4. The process of claim 1 wherein the diester of carbonic acid has the formula:

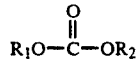

in which each of $R_1$ and $R_2$ separately represents a monovalent radical selected from the group consisting of alkyl, aralkyl, and aryl.

5. The process of claim 1 wherein the diester of carbonic acid is selected from the group consisting of dimethyl carbonate, diethyl carbonate, and diphenyl carbonate.

6. The process of claim 1 wherein the tertiary amine has the formula:

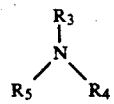

in which each of $R_3$, $R_4$, and $R_5$ separately represents a monovalent radical selected from the group consisting of $C_1-C_{30}$ alkyl, hydroxyalkyl, aryl, and aralkyl.

7. The process of claim 1 wherein the tertiary amine is selected from the group consisting of trimethylamine, triethylamine, tributylamine, N,N-dimethylcyclohexylamine, N,N-dimethylethanolamine, 1,8-diazabicyclo[5.4.0]undec-7-ene (DBU), 1,4-diazabicyclo[2.2.2]octane (DABCO), 1,2-bis(N,N-dimethylamino)ethane, 1,3-bis(N,N-dimethylamino)propane, and pyridine.

8. The process of claim 1 wherein the ion-exchange resin is a weak-base resin that contains an active tertiary amine group selected from dimethylamino, diethylamino, and di-n-butylamino.

9. A process for making a polyalkylene carbonate polymer, said process comprising reacting a diol having at least 4 carbons separating the hydroxyl groups with a diester of carbonic acid in the presence of a tertiary amine at a temperature and for a time sufficient to produce the polyalkylene carbonate polymer.

10. The process of claim 9 wherein the diol has the formula:

$$HO-(CRR')_n-OH$$

in which R and R' each separately represent monovalent radicals selected from the group consisting of hydrogen, $C_1$–$C_5$ alkyl, $C_1$–$C_{10}$ aryl, and $C_1$–$C_{10}$ aralkyl, and n is an integer from 4 to 10.

11. The process of claim 9 wherein the diol is selected from the group consisting of 1,4-butanediol, 1,5-pentanediol, 1,6-hexanediol, 3-methyl-1,5-pentanediol, and mixtures thereof.

12. The process of claim 9, wherein the diester of carbonic acid has the formula:

$$R_1O-\overset{\overset{O}{\|}}{C}-OR_2$$

in which $R_1$ and $R_2$ each separately represent monovalent radicals selected from the group consisting of alkyl, aralkyl, and aryl.

13. The process of claim 9 wherein the diester of carbonic acid is selected from the group consisting of dimethyl carbonate, diethyl carbonate, and diphenyl carbonate.

14. The process of claim 9 wherein the tertiary amine has the formula:

$$R_1O-\overset{\overset{O}{\|}}{C}-OR_2$$

in which each of $R_3$, $R_4$, and $R_5$ separately represents a monovalent radical selected from the group consisting of $C_1$–$C_{30}$ alkyl, hydroxyalkyl, aryl, and aralkyl.

15. The process of claim 9 wherein the tertiary amine is selected from the group consisting of trimethylamine, triethylamine, tributylamine, N,N'-dimethylcyclohexylamine, N,N-dimethylethanolamine, DBU, DABCO, 1,2-bis(N,N-dimethylamino)ethane, and pyridine.

* * * * *